US007758014B2

(12) United States Patent  (10) Patent No.: US 7,758,014 B2
Lancaster  (45) Date of Patent: Jul. 20, 2010

(54) HIGH-PRESSURE MINIATURE NEEDLE VALVE WITH PRESSURE-ENHANCED SEAL

(75) Inventor: Michael F. Lancaster, Middleburg Heights, OH (US)

(73) Assignee: Noshok, Inc., Berea, OH (US)

(*) Notice: Subject to any disclaimer, the term of this patent is extended or adjusted under 35 U.S.C. 154(b) by 255 days.

(21) Appl. No.: 11/471,690

(22) Filed: Jun. 20, 2006

(65) Prior Publication Data

US 2007/0290158 A1 Dec. 20, 2007

(51) Int. Cl.
*F16K 47/00* (2006.01)
(52) U.S. Cl. .................. 251/122; 251/214; 251/903
(58) Field of Classification Search .......... 251/214, 251/122, 121, 903; 137/903
See application file for complete search history.

(56) References Cited

U.S. PATENT DOCUMENTS

| 3,467,357 | A | * | 9/1969 | Weise et al. ............... 251/214 |
| 4,103,937 | A | | 8/1978 | Wakefield |
| 4,149,699 | A | | 4/1979 | Speckmann |
| 4,451,047 | A | * | 5/1984 | Herd et al. ................ 277/539 |
| 4,743,035 | A | | 5/1988 | Van Loom et al. |
| 4,745,938 | A | * | 5/1988 | Nimberger et al. ....... 137/15.18 |
| 4,964,432 | A | | 10/1990 | Chou |
| 5,439,027 | A | * | 8/1995 | Layton et al. ............ 137/513.5 |
| 6,123,339 | A | * | 9/2000 | Otsuji et al. ............... 277/602 |
| 6,820,857 | B1 | | 11/2004 | Lancaster |
| 6,935,616 | B2 | | 8/2005 | Baumann |
| 7,101,477 | B1 | * | 9/2006 | Willis et al. ............... 210/198.2 |
| 2005/0012065 | A1 | * | 1/2005 | Baumann .................... 251/282 |

* cited by examiner

*Primary Examiner*—John K Fristoe, Jr.
*Assistant Examiner*—Marina Tietjen
(74) *Attorney, Agent, or Firm*—Ulmer & Berne LLP

(57) ABSTRACT

A miniature needle valve having an improved internal body-to-bonnet metal-to-metal seal. The body seal incorporates a novel dovetail feature that improves the metal-to-metal contact forces as pressures increase. The space requirements of the seal are minimized in order to fit within a miniature valve body. The valve body can use dual outlet passageways to further minimize space requirements and improve the valve's flow characteristics. The body-to-bonnet seal improvements increase the pressure limits of the valve beyond similar-sized miniature needle valves of the prior art.

6 Claims, 3 Drawing Sheets

HIGH-PRESSURE MINIATURE NEEDLE VALVE WITH PRESSURE-ENHANCED SEAL

BACKGROUND OF THE INVENTION

The present invention relates to valves and in particular to instrument type needle valves having a rotating valve stem guided by a valve bonnet that is threaded into a valve body. The terms "valve stem", "valve bonnet", and "valve body" are sometimes referred to hereinafter as the "stem", "bonnet" and "body" respectively. More particularly, the present invention relates to the metal-to-metal seal between the bonnet and body that prevents high-pressure fluid from escaping the valve.

One common method of securing the bonnet to the body is with the use of threads. The bonnet to body metal-to-metal seal may be placed before or after the threads. If the seal is placed before the threads, it is considered to be "below" the threads and internal to the valve. If the seal is placed after the threads, it is considered to be "above" the threads and on the exterior of the valve. It is preferred in the art to have a bonnet-to-body metal-to-metal seal below the threads so that process fluids running through the valve do not touch or "wet" the threads and compromise their integrity. Additionally, metal-to-metal seals placed below the threads have smaller sealing areas than seals placed above the threads. The smaller the area, the lower the force required to offset the pressure by fluids on the seal. The size of the thread determines the maximum amount of force that can be applied to a given area. Therefore, given a fixed thread size, seals placed below the threads can sustain higher pressures than seals placed above the threads. Alternately, given a fixed pressure, a reduction in thread size is possible with seals below the threads.

Many needle valves in the art have seals below the bonnet threads. However, as the physical size of the valve is reduced, the valve ports and fluid passageways become closer to the seal, and the reduced space often limits the possibilities for a seal below the threads. Fluid pressures dictate the amount of threads required for sealing, i.e., higher pressures require more threads. However, it may not be possible to shorten the distance between threads without reducing the operating pressure of the valve. An alternative approach is to reduce the ports' sizes to make room for the seal, but reduced port sizes (in order to have a seal below the threads) also undesirably reduce flow rates. Therefore, the body-to-bonnet seal of miniaturized needle valves often is placed above the threads, as in U.S. Pat. No. 6,820,857 B1, incorporated herein by reference in its entirety. It would be an advantage to provide a high pressure miniature needle valve that has a seal below the bonnet threads without reducing the port sizes and changing the flow characteristics of the valve.

Over time, even the best seal may leak from normal valve use. If a leak occurs between the body and bonnet, it is desirable in the art that by further tightening the bonnet the added compression on the seal will stop the leak. This is not easily accomplished with a metal-to-metal seal. The surface finishes on metal-to-metal seals determine how well they seal, and over-tightening the bonnet can destroy the surface. Further tightening of the bonnet may also exceed design stresses for both the threads and the sealing surfaces, and undesirable yielding or galling may occur as a result. Such yielding or galling is undesirable because mating surfaces of metal-to-metal seals require a high degree of accuracy in order for them to mate properly. In fact, parts are usually manufactured to desirably maintain close tolerances. If a leak occurs between the bonnet and stem, it is desirable in the art to be able to remove the bonnet from the body to access the stem seal for replacement, and thereafter to reassemble the valve without damage to the metal-to-metal seal. Therefore, a need exists for a reliable and repeatable bonnet-to-body metal-to-metal seal that allows for additional compression without damage to the seal.

Alternative sealing methods are used in the art in order to avoid the problems associated with metal-to-metal seals. One alternative sealing method is to use an elastomeric seal between the body and bonnet. However, valves that are under high pressures and elevated temperatures may not be able to employ elastomeric seals. It is known in the art that metal-to-metal seals far exceed the pressure and temperature limits of elastomers. Another alternative is to use a soft metal seal, such as brass, imposed between the body and bonnet that yields to the shape of the harder surfaces without destroying them. Because the physical properties of soft metal seals do not match the body and bonnet material, fluid compatibilities may restrict the use of the valve. If, for example, the body and bonnet are stainless steel, a corrosive fluid may attack the soft metal seal. The addition of any component including coatings that do not match the physical properties of the body and bonnet may raise concerns about fluid compatibilities and in service use.

Also, by adding a sealing component, two sets of leak paths exist (between the bonnet to sealing component and between the body to sealing component) instead of one (between the body and bonnet). In addition, the added sealing component and increased assembly times may raise the cost of the valve. In each case, the removal of the bonnet and replacement of the sealing component is required in order to repair the seal. By improving on the metal-to-metal seal, the added complexities and costs associated with alternative sealing methods can be avoided.

The disadvantages of the prior art are overcome by the present invention. Improved methods and apparatus are provided herein for effectively sealing a high-pressure fluid within a miniature needle valve.

SUMMARY OF INVENTION

The present invention is an improved high-pressure miniature needle valve. It is an object of the invention to provide a bonnet-to-body metal-to-metal seal that is below the bonnet threads and fits within the confines of a miniaturized needle valve body while maintaining the port sizes and flow rates of similar sized miniaturized needle valves of the prior art.

Improvements to the sealing area of the body and bonnet are made to achieve a high-pressure seal that is strengthened by an increase in fluid pressure. The sealing surface of the body is forced against the bonnet seal through a novel dovetail undercut in the body. A suitable amount of supporting material (i.e., valve metal) is left bridging the space between the body-to-bonnet metal-to-metal seal and the dovetail undercut to rigidly support the torque required for sealing, yet the supporting material remains thin enough to allow the body to flex toward the bonnet during high pressures.

The bonnet of the present invention utilizes the small area between the thread and the bonnet bore to incorporate a sealing surface. A small flat area is designed to raise the bearing stresses up to the level that can slightly penetrate the valve body as it yields from the torque. The remainder of the sealing surface has a slight taper that increases the bearing area to balance the force from the torque and stop the valve body from yielding.

It also is an object of the present invention to offer a steel miniature needle valve designed for a maximum operating pressure of about 10,000 psi. Needle valves having about 10,000 psi pressure ratings and equivalent flow areas are often twice the physical size of the present invention. Due to the amount of material sustaining the pressures, steel miniature needle valves with large fluid passageways have traditionally been limited to about 6000 psi. Therefore, there exists a commercial advantage in offering a miniaturized needle valve that can sustain high pressures and flow rates of prior art valves twice its size.

It further is an object of the present invention to maximize the valve's flow rate in a minimum amount of space. The present invention segregates the single output passageway into dual outlet passageways with an equivalent flow area. The outlet passageways or holes are arranged in a novel manner in order to allow for machining from a single outlet port. The dual outlet holes break into the dovetail undercut for the required flow and leave enough material for the positioning of the internal metal-to-metal seal. The improved flow path reduces turbulence and improves the flow rate of the valve.

BRIEF DESCRIPTION OF DRAWINGS

The features and advantages of the present invention will be apparent from the following description taken in connection with the figures wherein.

DETAILED DESCRIPTION

Figures 1, 2:
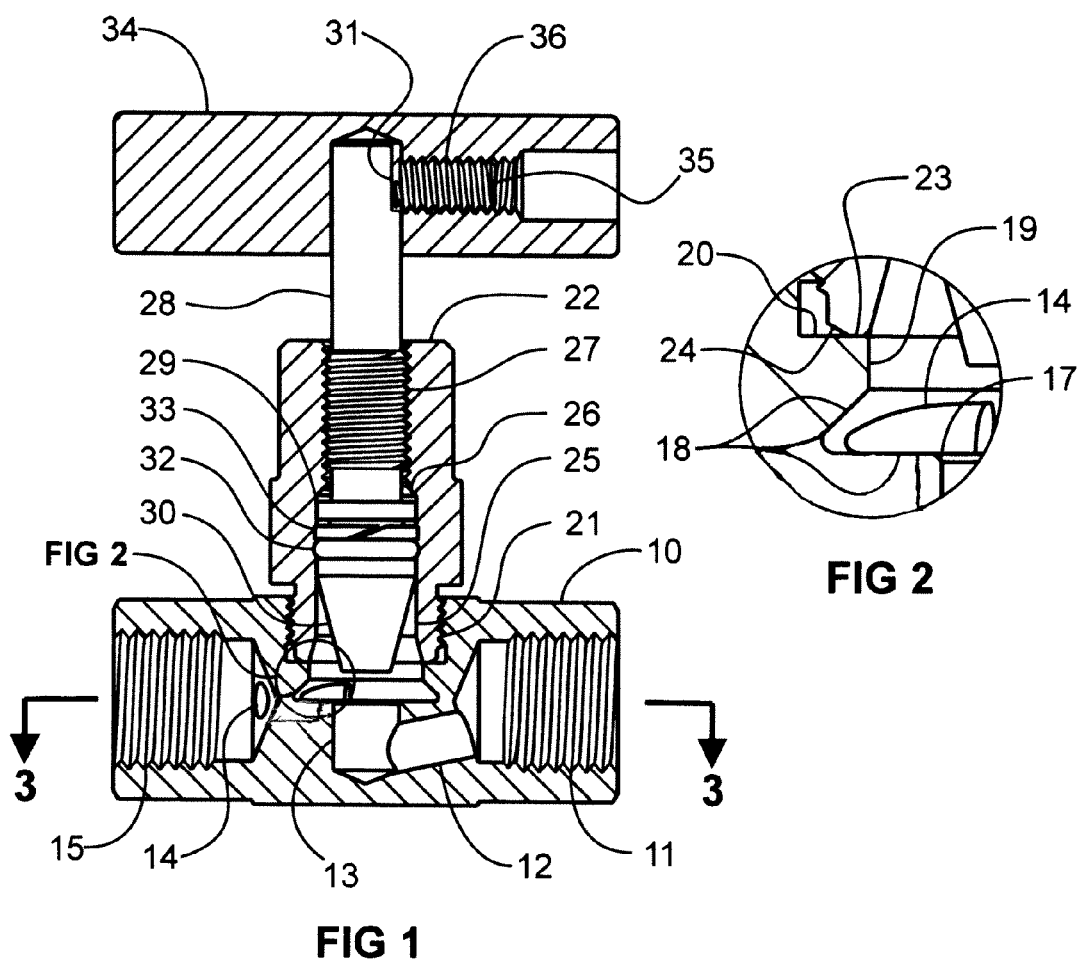
FIG. 1 is a front view, in cross-section, of the valve structure embodying the present invention with the stem in the open position.
FIG. 2 is a detail view of FIG. 1 of the metal-to-metal bonnet-to-body seal showing the outlet port intersecting the dovetail undercut.
Figure 5:
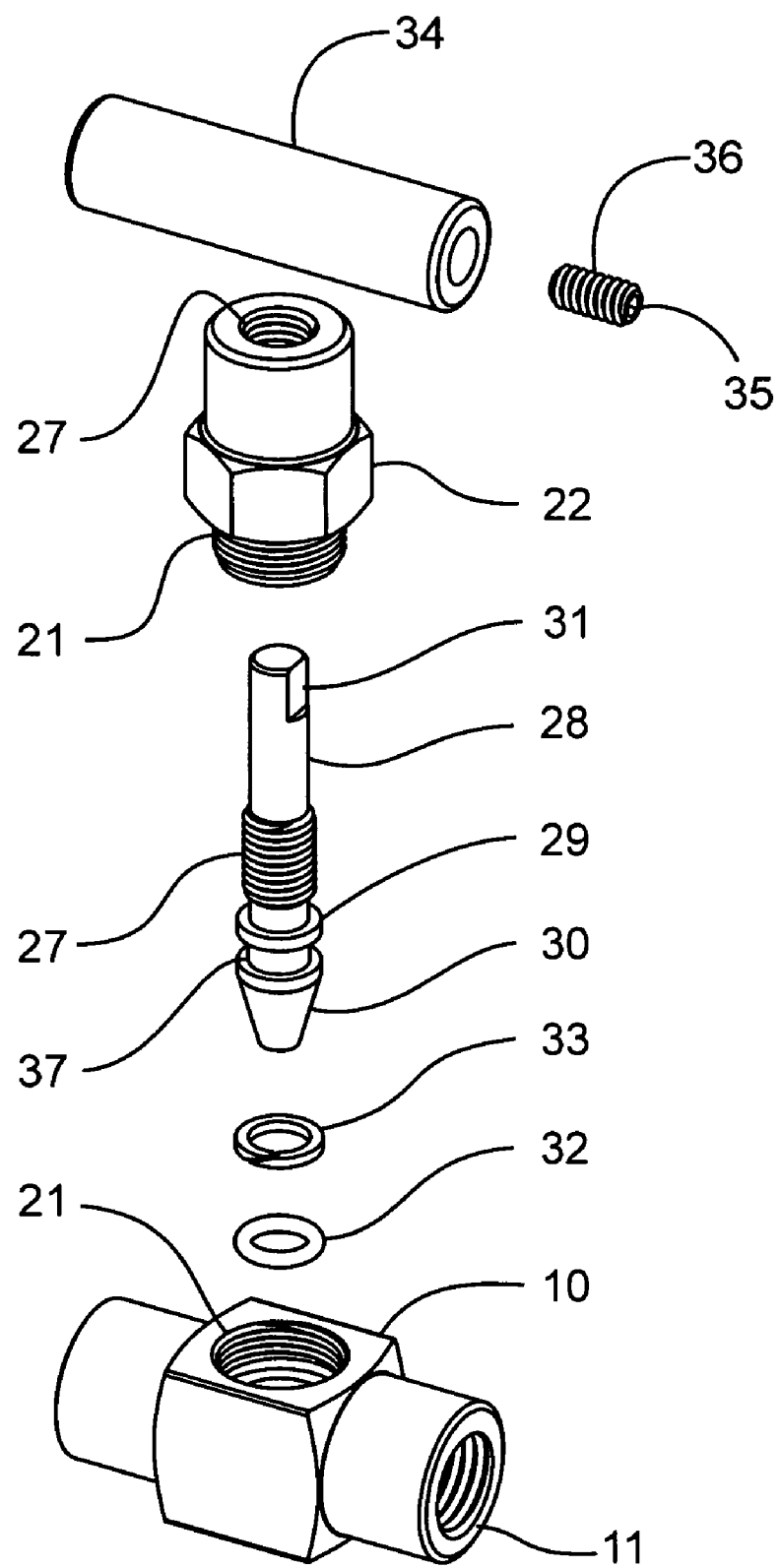
FIG. 5 is an isometric exploded view of the present invention shown with a female-female body.

An improved valve structure is depicted in FIGS. 1 and 5 as a miniature needle valve having a stem 28 guided by a bonnet 22 that is secured to a valve body 10. The bonnet 22 with the use of threads 27 guides the stem 28. The bonnet 22 and stem 28 sub-assemblies are secured to the body 10 with the use of threads 21. The bonnet 22 locates the stem 28 axially with respect to the central body fluid passageway 13. The stem 28 is rotated by means of an attached handle 34. The handle 34 is attached to the stem 28 with the use of set screw 35 driven by the use of threads 36 against the stem flat 31. In a preferred embodiment, the valve body 10, bonnet 22 and stem 28 are made from steel having a minimum tensile strength of about 60,000 psi and a shear strength of about 45,000 psi.

As illustrated in FIGS. 1 and 5 and known in the art, a high pressure seal can be achieved between the stem 28 and bonnet 22 with the use of an elastomeric o-ring 32 and a plastic back-up ring 33 installed in a stem groove 37 which runs along the inside of the bonnet bore 25. To optimize this seal, close tolerances, surface finishes and elastomeric selection play an important role. The clearance between the stem 28 and the bonnet bore 25 should be maintained between a range of about 0.001 and about 0.003 inches and surface finishes should be held to about 32 microinches or less. In a preferred embodiment, an approximate 70-durometer elastomer is used. The selection of a particular elastomer is based on the media to which the o-ring will be exposed. Typical elastomers include, but are not limited to, nitrile rubbers, ethylene-propylene-diene (EPDM) rubbers, polyfluorocarbons, and perfluoroelastomers.

Additionally, a secondary metal-to-metal seal is established by rotating the stem counterclockwise until the stem sealing edge 29 makes contact with the bonnet thread chamfer 26. This secondary seal is especially useful if the valve exceeds the recommended pressure ratings. This type of sealing arrangement is known in the art as a blowout-proof stem with a positive back seal. The elastomeric seals in the present invention typically are limited to a maximum pressure of about 20,000 psi, which is about two times the pressure rating of the valve. For safety beyond this point, and to match the bonnet 22 to body 10 metal-to-metal sealing capabilities, this secondary seal typically is required.

Figure 3:
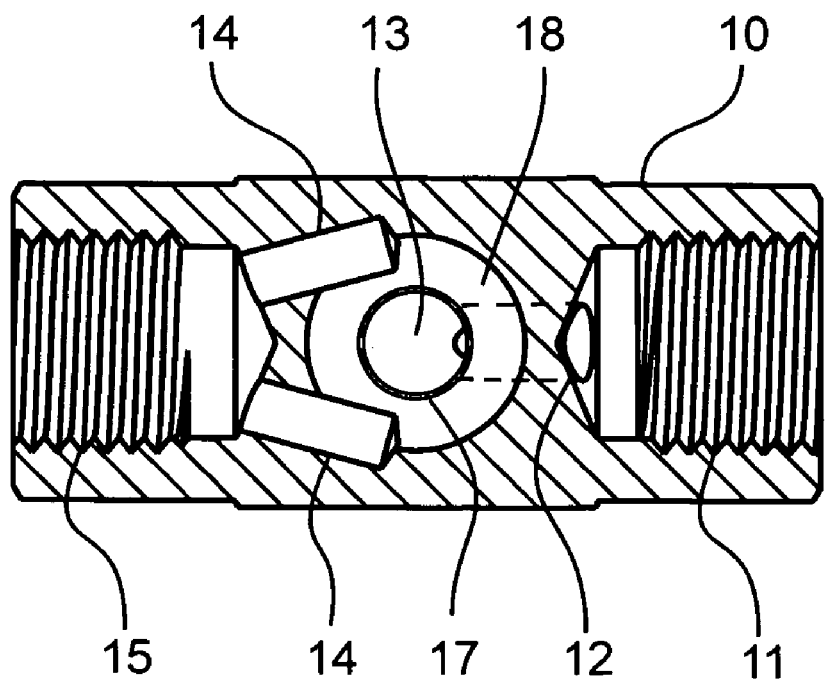
FIG. 3 is a top view cross-section of a female-female threaded port body as indicated by the arrows of FIG. 1 cut along its centerline to show the path of the dual outlet port.
Figure 4:
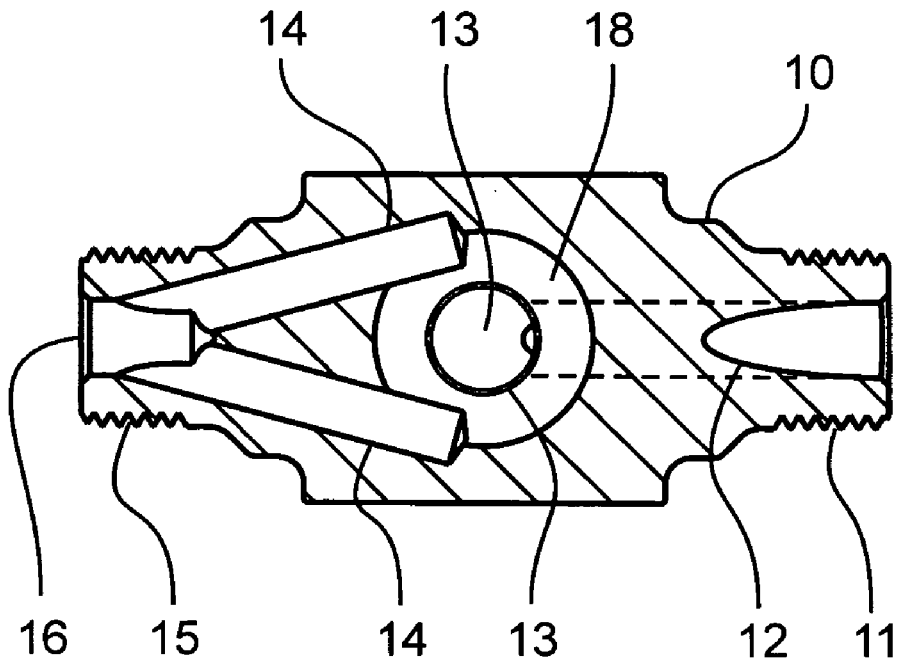
FIG. 4 is a top view cross-section of an alternative male-male threaded port body analogous to the arrows of FIG. 1 cut along its centerline to show the path of the dual outlet ports.

In a preferred embodiment of the present invention, the valve body 10 is about a ¾" square and the pipe connections range from ⅛" NPT to ¼" NPT. The valve body 10 comprises an inlet port 11 and an outlet port 15 threaded for the corresponding pipe threads. Fluid travels from the inlet port 11 to the inlet port passageway 12 to a central body fluid passageway 13 and then exits at fluid outlet passageway 14 to the outlet port 15, as shown in FIGS. 1, 3 and 4. In a preferred embodiment, fluid passageway 12 and fluid passageway 14 have equal flow areas. When the stem 28 is rotated clockwise, it is driven axially toward annular sealing surface 17 that engages with the tapered stem tip 30 to form a metal-to-metal seal, thereby closing the valve's central body fluid passageway 13 as shown in FIGS. 1 and 2. A preferred size of the annular sealing surface 17 is about an 0.010 in wide chamfer on the edge of central body fluid passageway 13. This annular sealing surface 17 is easily closed with a low amount of torque from the handle 34. Over the life of the valve, the annular sealing surface 17 wears and increases in size, making the required torque increase to compensate for the larger sealing area. Eventually, the seat wears down and the valve needs to be replaced. A soft tip stem as shown in U.S. Pat. No. 6,820,857 B1, incorporated herein by reference in its entirety, may be used as an alternative to this metal-to-metal seal.

The bonnet 22 to body 10 seal as shown in FIGS. 1 and 2 represents a metal-to-metal sealing arrangement according to the present invention. FIG. 2 depicts the detailed features of the high-pressure metal-to-metal seal that can be incorporated in a wide variety of alternative embodiments of the valve body 10. The body sealing surface 20 is an annular area that extends from the bottom of body threads 21 to fluid opening 19, which is equivalent in diameter to the opening of the bonnet bore 25. The bonnet sealing surface 23 is on a surface perpendicular to the bonnet axis anterior to the valve bonnet threads 21 and is an annular area defined by a region between the minor diameter of the valve bonnet threads 21 and the valve bonnet bore 25. The bonnet sealing surface 23 contacts body sealing surface 20 upon threading the bonnet into threads 21 and applying a clockwise rotation to the bonnet 22. In a preferred embodiment, the sealing area is designed below the threads 21 to maximize the ratio of the applied torque (from which a contact force is derived) to the sealing area. The bonnet sealing surface 23 on the end of the bonnet 22 lies between the minor diameter of threads 21 and the valve bonnet bore 25. This area is further split between the annular bonnet sealing surface 23 and bonnet chamfer 24.

The annular contact area of bonnet sealing surface 23 is calculated to apply a bearing stress high enough to slightly penetrate body sealing surface 20 and slightly embed bonnet sealing surface 23 in body sealing surface 20 to form a mating impression in said body sealing surface 20 and effect a seal.

The permanent deformation formed in body sealing surface 20 during initial assembly is designed so the bonnet sealing surface 23 can make its own mating surface, thereby eliminating the need to have an accurately machined body sealing surface 20. To reduce the initial contact area to the proper size, a bonnet chamfer 24 of about twenty degrees (20°) is added as a control feature. Once the body begins to yield, the sealing area increases as the body sealing surface 20 makes contact with the bonnet chamfer 24. A small gap remains between the bonnet chamfer 24 and the body sealing surface 20 once the contact forces balance the applied torque and movement stops. The bonnet chamfer 24 and the body sealing surface 20 remain a small distance apart for further tightening of said bonnet in the event that a leak occurs between the bonnet-to-body metal-to-metal seal, and further tightening of said bonnet closes the gap to add to the sealing area in order to stop the leak. In a preferred embodiment, the valve is manufactured from steel and has a maximum operating pressure of about 10,000 psi, and the bonnet-to-body metal-to-metal seal is capable of sealing pressure up to about 40,000 psi.

In the present invention, fluid pressure acting on an area equivalent to fluid opening 19 is equal to the maximum force that acts to segregate the bonnet 22 from the body 10 and produce a leak between the metal-to-metal seal. A required torque is calculated, by methods well known to those skilled in the art, to produce contact forces on the metal-to-metal seal that counteract the forces produced from the fluid pressures acting on this area. For safety reasons, industry standards dictate that the valve will not leak at about two times the pressure rating of the valve and will not burst at about four times the pressure rating. For additional safety, the preferred embodiment of the present invention is designed not to burst or leak at about four times the rated pressure. Therefore, calculating an accurate amount of applied torque is important in designing and selecting a valve that is appropriate to conditions in which it will be used.

Torque calculations in the present invention are computed using methods well known by those skilled in the art using the burst rating of the valve (about 40,000 psi) to derive the shear area requirements of the threads 21 and therefore the required length of thread engagement. However, space limitations in the valve body 10 make it difficult to use the calculated thread length. Nevertheless, in order to achieve the desired pressure rating in the present invention, the calculated thread length is maintained and instead, the flow path is rerouted around the remaining body space. Typically in the prior art, the torque used to derive the thread length would generate contact forces on the metal-to-metal seal that exceed the desired bearing stress between bonnet sealing surface 23 and body sealing surface 20. In addition, galling of the contact surfaces often occurred in the prior art when excessive friction was produced between the sliding surfaces. Although the threads are capable of more, the bonnet 22 in the present invention is only torqued to a level that achieves a seal and prevents damage to the sealing surfaces. Without additional contact forces the valve would be unable to sustain about 40,000 psi without leaking. To produce the additional contact forces, the present invention introduces a dovetail undercut 18.

Upon first impression, one might assume that the dovetail undercut 18 would adversely weaken the supporting structure of body sealing surface 20. However, by intentionally weakening the body sealing surface structure, the dovetail undercut 18 offers several surprising advantages over the prior art. By removing metal below the body sealing surface 20 the calculated bearing stresses required to effect a seal cannot be exceeded without the body sealing surface 20 flexing inward toward central body fluid passageway 13. This intentional flexing prevents excessive bearing stresses from occurring which would normally damage the sealing surfaces. If too much metal is removed, body sealing surface 20 will flex before achieving the desired contact forces for establishing a seal. It is therefore, important to leave enough material to effect a seal. To provide the required stiffness to effect a seal, a minimum of about 0.060 inch thickness of material is left between the body sealing surface 20 and the dovetail undercut 18. In addition, the dovetail undercut 18 is machined at about a 30 degree angle to act as a truss supporting the bridged area of body sealing surface 20. This arrangement provides enough support to effect a seal and then flex when the axial forces exceed the target range designed by those skilled in the art. If a slight flexing does occur, it occurs within the elastic range of the material and adds to the contact area between bonnet chamfer 24 and body sealing surface 20. As mentioned above, once the bonnet is torqued, a small gap exists between body sealing surface 20 and the bonnet chamfer 24. Over time, if a leak occurs, the bonnet 22 may be further tightened to close this gap without damaging the metal-to-metal seal. In the event that a leak occurs between the bonnet 22 to stem 28 seal, the bonnet 22 can be easily removed to repair the seal and reassembled without damage to the metal-to-metal seal.

Another advantage of this dovetail undercut 18 is to take advantage of extreme fluid pressures by assisting and increasing the contact forces between the body sealing surface 20 and the bonnet sealing surface 23. Under high fluid pressures the body sealing surface 20 flexes upwards and outwards towards bonnet sealing surface 23 as the fluid pressure spreads the dovetail apart, further compressing the seal and adding to the contact forces. On valves manufactured from steel, the combination of the proper torque and the extra forces produced from the fluid pressure produce enough compression for a leak-free metal-to-metal seal up to about 40,000 psi. Beyond this pressure range, either the bonnet threads 21 or the port threads may yield and a leak may occur.

The dovetail undercut 18 can also be used in conjunction with dual outlet ports 14. The limited amount of space in the valve body 10 presents some challenges in achieving the desired flow area. As shown in U.S. Pat. No. 6,820,857, incorporated herein by reference in its entirety, placing the bonnet-to-body seal above the threads provides space for an outlet port and distance between the body-to-bonnet seal. By placing the metal-to-metal seal below the bonnet threads the space between central body fluid passageway 13 and body fluid hole 19 shrinks, and the placement of an outlet port passageway becomes difficult because accessing this space requires getting too close to central body passageway 13 and annular sealing surface 17. Also, the supporting material below body sealing surface 20 must be maintained, so the outlet fluid passageway must be placed a safe distance below this surface. The present invention has overcome these difficulties in a preferred embodiment by placing dual outlet passageways 14 under the body sealing surface 20 without disturbance to the structural intent and function of the dovetail undercut 18. The dovetail undercut also allows the dual outlet passageways 14 to remain a safe distance away from central body fluid passageway 13 and annular sealing surface 17.

As seen in FIGS. 3 and 4, dual outlet port passageways 14 utilize an angled trajectory to slice along the side of the dovetail undercut 18 and open an area equivalent to the inlet port passageway 12. FIG. 3 depicts a valve body 10 with a ¼" NPT female inlet and ¼" NPT female outlet port. FIG. 4 depicts a valve body 10 with a ⅛" male inlet and ⅛" male outlet port. As seen in FIG. 4, the dual outlet passageways 14 can be machined from a single entry point where the fluid streams would merge during fluid flow. On the male-male body 10 of FIG. 4, a single outlet port fluid passageway 16 joins the dual outlet port passageways 14. In a preferred embodiment, a miniature needle valve has a flow coefficient of about 0.40 as defined by the ANSI/ISA 75.02-1996 industry standard, and a valve body comprises about a ¾" square with said fluid passageways having a flow area of about 0.0232 in². In a preferred embodiment the dual outlet passageways 14 comprise a total volume about equal in volume to the inlet port passageway 12 of the valve body 10; intersect the dovetail undercut 18 of the valve body 10 while remaining a sufficient distance away from the body sealing surface 20 so as not to affect the bonnet-to-body metal-to-metal seal; and are symmetrically angled with respect to the port axis of the valve body outlet port 15, thereby removing metal alongside the body central fluid passageway while maintaining a minimum of about 0.030 inch of supporting metal between the dual outlet passageways 14 and the central body fluid passageway 13 so as to effect a seal between the valve stem 28 and the annular sealing surface 17.

Thus the present invention comprises an improved valve structure wherein those skilled in the art will recognize that modifications could be made without departing from the spirit and scope of the present invention. For example, the bonnet can be attached to a body that allows the outlet fluid passageways to enter into the dovetail region at different angles. Typical such angles can range from about 5 degrees to about 45 degrees, preferably from about 10 degrees to about 20 degrees. The valve can be manufactured from alternate materials with maximum operating pressures lower or higher than steel and have a corresponding improvement in the pressure rating of the valve by utilizing the present invention.

One preferred embodiment of the present invention comprises: A miniature needle valve for fluid control comprising a valve body comprising inlet and outlet ports, a fluid passageway between said inlet and outlet ports, a body central fluid passageway perpendicular to said fluid passageway between said inlet and outlet ports, an annular sealing surface between the outlet port passageway and said body central fluid passageway, a valve body sealing surface above said fluid passageway between said inlet and outlet ports, a valve bonnet with threaded engagement with said valve body for axially moving said bonnet against said valve body sealing surface, a valve stem having threaded engagement with said valve bonnet and movably mounted in relation to said annular sealing surface for moving said valve stem toward and outwardly from said annular sealing surface, and a compressible valve seal between said valve stem and said valve bonnet in order to prevent a loss of fluid past said valve stem, and further comprising:

a bonnet-to-body metal-to-metal seal for at least reducing and preferably preventing the loss of fluid from said valve, said valve body sealing surface being internal to said valve body and below the valve body threads, and said valve body sealing surface having an annular area about equal to the minor diameter of said valve body threads and the valve bonnet bore; and a dovetail undercut between said valve body sealing surface and said annular sealing surface for relieving stress on said valve body sealing surface when the contact forces of said bonnet exceed the amount of force required in order to effect a seal, while remaining an effective distance away from said bonnet-to-body metal-to-metal seal in order to support the forces required to effect a seal;

said dovetail undercut machined below said valve body sealing surface in order to allow high pressure fluids to push the supporting body material of said body sealing surface against said bonnet for further compression of said valve body to said bonnet-to-body metal-to-metal seal.

Accordingly, it should be understood that methods and apparatus described herein and shown in the accompanied drawings are intended as exemplary embodiments and not as limitations. Those skilled in the art will recognize that further modifications made in detail and form are possible without departing from the spirit and scope of the invention.

What is claimed is:

1. A miniature needle valve for fluid control comprising
a valve body comprising inlet and outlet ports,
a fluid passageway between said inlet and outlet ports,
a body central fluid passageway perpendicular to said fluid passageway between said inlet and outlet ports,
an annular sealing surface between the outlet fluid passageway and said body central fluid passageway,
a valve body sealing surface above said fluid passageway between said inlet and outlet ports,
a valve bonnet with threaded engagement with said valve body for axially moving said bonnet against a portion of said valve body sealing surface,
a valve stem having threaded engagement with said valve bonnet and movably mounted in relation to said annular sealing surface for moving said valve stem toward and outwardly from said annular sealing surface, and
a compressible valve seal between said valve stem and said valve bonnet in order to prevent a loss of fluid past said valve stem, and said valve further comprising:
a bonnet-to-body metal-to-metal seal for at least reducing and preferably preventing the loss of fluid from said valve,
said valve body sealing surface being internal to said valve body and below the valve body threads, and
said valve body sealing surface having an annular area about equal to the minor diameter of said valve body threads and the valve bonnet bore; and
a dovetail undercut between said valve body sealing surface and said annular sealing surface for relieving stress on said valve body sealing surface when the contact forces of said bonnet exceed the amount of force required in order to effect a seal, while remaining an effective distance away from said bonnet-to-body metal-to-metal seal in order to support the forces required to effect a seal;
said dovetail undercut machined directly below said portion of said valve body sealing surface contacted by said bonnet in order to allow high pressure fluids to push the supporting body material of said valve body sealing surface against said bonnet for further compression of said valve body to said bonnet-to-body metal-to-metal seal.

2. The miniature needle valve of claim 1, said valve body further comprising
dual outlet passageways in said valve body and between said valve body sealing surface and said annular sealing surface and comprising
a total volume about equal in volume to the inlet passageway of said valve body, wherein:
said dual outlet passageways intersect said dovetail undercut of said valve body while remaining a sufficient distance away from said valve body sealing surface so as not to affect said bonnet-to-body metal-to-metal seal; and said dual outlet passageways are symmetrically angled with respect to the port axis of said valve body, thereby removing metal alongside said body central fluid passageway while maintaining a minimum of about 0.030 inch of supporting material between said dual outlet passageways and said body central fluid passageway so as to effect a seal between said valve stem and said annular sealing surface.

3. The miniature needle valve of claim 1, wherein
a bonnet sealing surface is on a surface perpendicular to the bonnet axis,
  anterior to the valve bonnet threads and is an annular area defined by a region between the minor diameter of said valve bonnet threads and said valve bonnet bore, wherein;
  said bonnet sealing surface is further split by a bonnet chamfer to reduce the initial contact area of said bonnet sealing surface with said valve body sealing surface
    so that upon torque of said bonnet,
    said bonnet sealing surface will impose bearing stresses that will slightly embed said bonnet sealing surface in said valve body sealing surface to form a mating impression in said valve body sealing surface and effect a seal; and
    said bonnet chamfer and said valve body sealing surface remain a small distance apart for further tightening of said bonnet in the event that a leak occurs between said bonnet-to body metal-to-metal seal, and wherein
      further tightening of said bonnet closes the gap to add to the sealing area in order to stop the leak.

4. The miniature needle valve of claim 1,
wherein said valve is manufactured from steel and has a maximum operating pressure of about 10,000 psi, and
wherein said bonnet-to-body metal-to-metal seal is capable of sealing pressure up to about 40,000 psi; and
said pressure capabilities are produced from a torque imposed on said bonnet to effect a seal with said valve body, combined with the forces exerted by a high pressure fluid against said dovetail undercut that further compresses said seal.

5. The miniature needle valve of claim 1,
wherein said miniature needle valve has a flow coefficient of about 0.40 as defined by the ANSI/ISA 75.02-1996 industry standard, and
said valve body comprises about a ¾" square with said fluid passageways having a flow area of about 0.0232 in$^2$.

6. A miniature needle valve for fluid control comprising
a valve body comprising
  inlet and outlet ports,
  a fluid passageway between said inlet and outlet ports,
  a body central fluid passageway perpendicular to said fluid passageway between said inlet and outlet ports,
  an annular sealing surface between the outlet fluid passageway and said body central fluid passageway,
  a valve body sealing surface above said fluid passageway between said inlet and outlet ports,
  a valve bonnet with threaded engagement with said valve body for axially moving said bonnet against a portion of said valve body sealing surface,
  a valve stem having threaded engagement with said valve bonnet and movably mounted in relation to said annular sealing surface for moving said valve stem toward and outwardly from said annular sealing surface, and
  a compressible valve seal between said valve stem and said valve bonnet in order to prevent a loss of fluid past said valve stem, and
said valve further comprising:
  a bonnet-to-body seal for at least reducing the loss of fluid from said valve,
    said valve body sealing surface being internal to said valve body and below the valve body threads,
    and said valve body sealing surface having an annular area about equal to the minor diameter of said valve body threads and the valve bonnet bore; and
      a dovetail undercut between said valve body sealing surface and said annular sealing surface, wherein said dovetail undercut is machined directly below said portion of said valve body sealing surface contacted by said bonnet.

* * * * *